United States Patent [19]

Oba et al.

[11] Patent Number: 4,977,415

[45] Date of Patent: Dec. 11, 1990

[54] ELECTROSTATIC RECORDING HEAD, IMAGE RECORDING APPARATUS, DEVELOPING AGENT SUPPLYING DEVICE, DISPLAY DEVICE AND METHOD OF PRODUCING ELECTROSTATIC RECORDING HEAD

[75] Inventors: Sayoko Oba; Katsumi Muroi; Kenji Okuna; Hidefumi Ohtsuka, all of Ibaraki; Tsutomu Iimura, Tachikawa; Ryoji Kojima, Katsuta; Keisuke Kurihara, Yokohama, all of Japan

[73] Assignees: Hitachi, Ltd.; Hitachi Koki Co., Ltd.; Hitachi Metals, Ltd., all of Tokyo, Japan

[21] Appl. No.: 420,480

[22] Filed: Oct. 12, 1989

[30] Foreign Application Priority Data

Oct. 17, 1988 [JP] Japan ................................ 63-260739

[51] Int. Cl.$^5$ ................................ G01D 15/00

[52] U.S. Cl. ................................ 346/155

[58] Field of Search .................. 346/160, 160.1, 153.1, 346/155

[56] References Cited

U.S. PATENT DOCUMENTS 4,763,143 8/1988 Ohba et al. ....................... 346/153.1

FOREIGN PATENT DOCUMENTS 171063 10/1983 Japan .

219761 12/1984 Japan .

11371 1/1985 Japan ................................ 346/153.1

58875 4/1985 Japan .

156074 8/1985 Japan .

*Primary Examiner*—Donald A. Griffin

*Attorney, Agent, or Firm*—Antonelli, Terry, Stout & Kraus

[57] ABSTRACT

An electrostatic recording head for causing a developing agent to be electrostatically deposited on the surface of a recording member in accordance with a recorded image, comprising a recording electrode having a plurality of linear electrodes arranged in a common plane at a predetermined interval; a magnet disposed at one side of the recording electrode; and a magnetic member disposed at the side of the recording electrode opposite to the magnet; the magnet being disposed such that the magnetic lines of force pass through the end of the recording electrode towards the portion of a recording member opposed by the end of the recording electrode. The present invention also relates to a method of producing this electrostatic recording head. The invention also is concerned with an image recording apparatus which employs this electrostatic recording head, as well as with a developing agent supplying device and a display device.

29 Claims, 5 Drawing Sheets

ELECTROSTATIC RECORDING HEAD, IMAGE RECORDING APPARATUS, DEVELOPING AGENT SUPPLYING DEVICE, DISPLAY DEVICE AND METHOD OF PRODUCING ELECTROSTATIC RECORDING HEAD

BACKGROUND OF THE INVENTION

1. Field of the Invention

The present invention relates to an electrostatic recording head for causing a developing agent to electrostatically deposit on the surface of a recording member in accordance with a recorded image, and also to a method of producing this electrostatic recording head. The invention also is concerned with an image recording apparatus which employs this electrostatic recording head, as well as with a developing agent supplying device and a display device.

2. Description of the Prior Art

Image recording techniques of the kind described above are disclosed in, for example, Japanese Patent Unexamined Publication Nos. 59-219761, 58-171063, 60-58875 and 60-156074. In these known techniques, a magnet is disposed on one side of a recording electrode and the state of a developing agent (referred to as "toner" hereinafter) supplied into the gap between a recording electrode and a recording member is optimized by magnetic force developed by the magnet.

Furthermore, according to Japanese Patent Unexamined Publication No. 59-219761, a toner transported in accordance with the movement of the recording member is made to deposit to a recording electrode by the magnetic force developed by the magnet so as to form a stable chain (referred to as "toner chain" hereinafter) in the gap between the recording electrode and the recording member so as to ensure a stable image formation, i.e., stable printing. When the printing is not conducted, the toner chain serves as a barrier which prevents surplus toner from being transported together with the recording member.

Unfortunately, however, no specific consideration is given to the distribution of magnetism generated around the recording electrode by the magnet provided in the recording electrode. For instance, when a strong magnet is used to enable the "toner chain" to satisfactorily function as the barrier, a strong magnetic field is formed around the recording electrode. In order to enable the toner to attach to the recording member for the purpose of recording, it is necessary to break the toner chain by applying a recording voltage. When the magnetic field formed around the recording electrode is strong, the level of the recording voltage which is to be applied to overcome this magnetic field is correspondingly high.

Furthermore, the use of a strong magnet causes a thick barrier to be formed over a wide region, which seriously impairs the fluidity of the toner. This impedes smooth supply of the new toner failing to compensate for the consumption of the toner in the toner chain during printing, so that the cleanness and the resolution are rendered unstable and increase in the recording speed is practically limited.

SUMMARY OF THE INVENTION

Accordingly, an object of the present invention is to provide an electrostatic recording head which enables recording to be performed stably and at high speed, with distinguished clearness and resolution, as well a a method of producing this electrostatic recording head and an image recording apparatus making use of this recording head.

It is also an object of the present invention to provide a toner supplying device which enables the rate of the toner supplied to the end portion of the electrostatic recording head to be controlled, thereby making it possible to perform high-speed recording with improved clearness and resolution.

It is also an object of the present invention to provide a display device which makes use of the above-mentioned electrostatic recording apparatus.

To these ends, according to one aspect of the present invention, there is provided an electrostatic recording head comprising: recording electrode having a plurality of linear electrodes arranged in a common plane at a predetermined interval; a magnet disposed at one side of the recording electrode; and a magnetic member disposed at the side of the recording electrode opposite to the magnet; the magnet being disposed such that the magnetic lines of force pass through the end of the recording electrode towards the portion of a recording member opposed by the end of the recording electrode.

Preferably, the plurality of linear electrodes are arrayed on an insulating substrate, and the magnet is disposed at the same side of the recording electrode as the insulating substrate while the magnetic member is disposed at the same side of the recording electrode as the linear electrodes.

It is also preferred that the ends of the magnet and the magnetic member adjacent to said end of the recording electrode are retracted from the end of the recording electrode by a predetermined distance.

It is also preferred that the magnet is a permanent magnet and the region between the magnet and the end of the recording electrode is covered by a non-magnetic or a magnetic cover.

It is also preferred that the region between the magnetic member and the end of the recording electrode is covered by a cover.

It is possible to provide a second magnetic member on the side of the magnet opposite to the electrode.

According to another aspect of the present invention, there is provided an image recording apparatus incorporating the electrostatic recording head of the type described above, wherein the electrostatic recording head is disposed such that the end of the recording electrode opposes the surface of a recording member which moves at a predetermined speed and such that the side of the recording electrode having the magnetic member is disposed on the trailing side as viewed in the direction of movement of the recording member, so that a developing agent reservoir is formed by the electrostatic recording head and the recording member at the trailing side of the electrostatic recording head as viewed in the direction of movement of the recording member, the apparatus further comprising means for continuously supplying a magnetic developing agent into the developing agent reservoir, and means for supplying recording voltage of levels corresponding to an image to be recorded to the linear electrodes of the recording electrode so as to cause the developing agent to be electrostatically deposited to the surface of the recording member.

Preferably, the recording member has a cylindrical form and the electrostatic recording electrode is disposed such that the end of the recording electrode extends along the generating line of the cylindrical surface of the recording member, the electrostatic recording head being inclined at a predetermined angle towards the developing agent reservoir with respect to the line normal to the cylindrical surface.

According to still another aspect of the present invention, there is provided a developing agent supplying device comprising: a hopper for storing a developing agent; and a developing agent supply rate control means provided in the bottom opening of the hopper, the bottom end opening of the hopper having an elongated form of a length substantially corresponding to the recording width, the developing agent supply rate control means includes a cylindrical rotary member disposed to close the bottom end opening of the hopper and having a slit formed therein so as to extend in the axial direction thereof.

It is preferred that the slit is divided into a plurality of sections in the axial direction of the rotary member, the sections being inclined at different angles to the axis of the rotary member.

It is also preferred that the developing agent supplying device further comprises control means for controlling the rotational position of the rotary member in accordance with the number of applications of the recording voltage to the recording electrode.

It is also preferred that a developing agent collecting device is provided which includes a magnet which is disposed to oppose the surface of the recording member at the downstream side of the electrostatic recording head.

According to a further aspect of the present invention, there is provided a display device which enables the image recorded on the transfer member of the image recording apparatus to be optically read and displayed on a display.

According to a further aspect of the present invention, there is provided a method of producing an electrostatic recording head comprising the steps of: preparing a recording electrode having an insulating substrate and a plurality of linear electrodes arrayed on one side of the insulating substrate at a predetermined interval; securing a non-magnetized permanent magnet member to the same side of the recording electrode as the insulating substrate; and magnetizing the permanent magnet member such that the magnetic lines of force from the magnetized permanent magnet run through the end of the recording electrode towards the portion of the recording member opposed by the end of the recording electrode.

In the electrostatic recording head of the present invention, a magnetic member is disposed on the opposite side of the recording electrode to the magnet. Portions of the magnetic lines of force produced by the magnet, which is on the opposite side to the toner reservoir, are absorbed by the magnetic member so that the magnetic field intensity is reduced in the space where the toner reservoir is disposed. However, the portion of the magnetic lines of force which is directed from the end of the recording electrode towards the recording member facing the end of the recording electrode is not weakened because this portion of the magnetic lines of force is not substantially influenced by the magnetic member.

In the image recording apparatus incorporating this electrostatic recording head, therefore, a magnetic field intensity distribution is obtained such that the highest level of magnetic field intensity is obtained in the region where the end of the recording electrode confronts the recording member across the gap (this region will be referred to as "recording gap" hereinafter) and the magnetic field intensity is drastically lowered in the direction of movement of the recording member towards the toner reservoir, so that a toner chain is formed only in the restricted region on the end of the recording electrode. This toner chain formed in the restricted region can be broken by a small quantity of electrostatic charges injected for the purpose of recording. Namely, the recording can be performed by a reduced recording voltage.

In addition, fluidity of the toner into the toner reservoir is improved so as to smooth and stabilize the supply of the toner to the recording region, thus offering a higher recording speed.

The optimized magnetic field intensity distribution and the improved fluidity of the toner make it possible to form a toner chain at a constant position on the recording region, so that images can be recorded with improved clearness and resolution. In a specific form in which a magnetic cover extending between the magnetic member and the end of the electrode is used, the magnetic field intensity in the region including the toner reservoir is further reduced so as to further increase the fluidity of the toner.

The developing agent supplying device of the present invention provides a uniform distribution of the supplied toner in the breadthwise direction of the recording of image, thus contributing to improvement in the quality of the recorded image.

The display device according to the invention enables a clear image recorded on the recoding member to be directly displayed on a display screen.

Furthermore, according to the method of the present invention for producing an electrostatic recording head, the magnet is magnetized after it is attached to the recording head, so that the assembly is facilitated as compared with the case where a magnetized permanent magnet is used, because the assembly can be conducted without being hindered by the magnetism of the magnet.

The above and other objects, features and advantages of the present invention will become clear from the following description of the preferred embodiments when the same are read in conjunction with the accompanying drawings.

DESCRIPTION OF THE PREFERRED EMBODIMENTS

Preferred embodiments of the present invention will be described with reference to the accompanying drawings.

Figure 1:
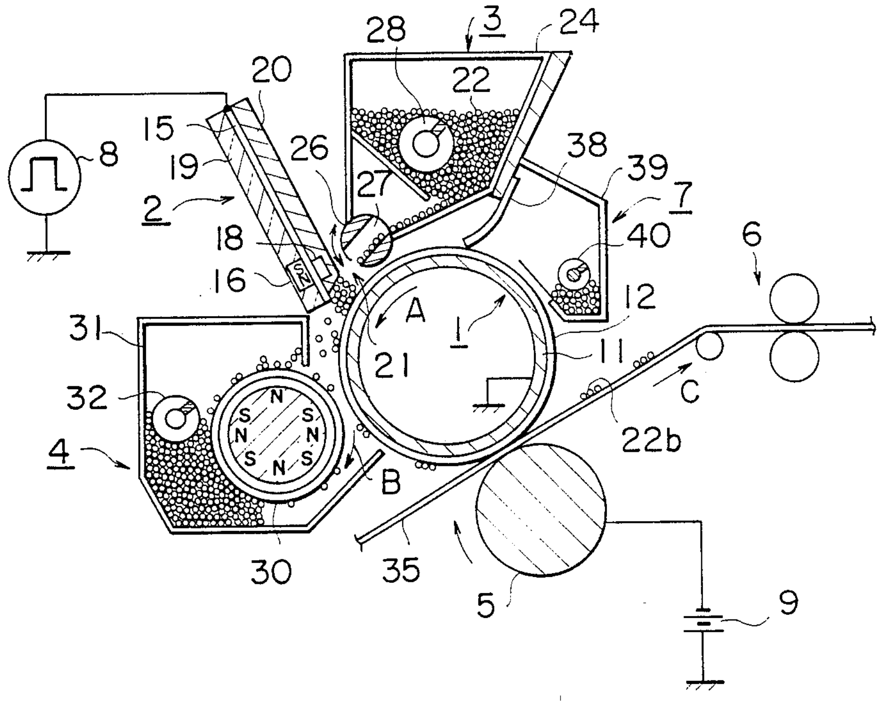
FIG. 1 is an illustration of a critical portion of an embodiment of the image recording apparatus in accordance with the present invention.
Figure 2:
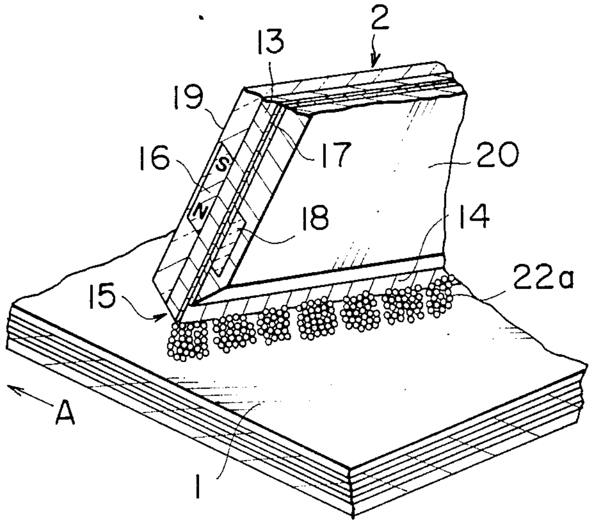
FIG. 2 is an enlarged perspective view of a portion of the embodiment shown in FIG. 1 around an electrostatic recording head incorporated in the embodiment of FIG. 1.

FIG. 1 illustrates the construction of an embodiment of the image recording apparatus in accordance with the present invention, while FIG. 2 shows, in an enlarged perspective view, an electrostatic recording head used in the image recording apparatus. As will be seen from FIG. 1, the image recording apparatus includes a recording member 1, an electrostatic recording head 2, a developing agent supplying device 3 for supplying a developing agent (referred to as "toner"), a first toner collection device 4, a transfer roller 5, a fixing roller 6, a second toner collection device 7, and a pulse driving circuit 8.

The recoding member 1 has a cylindrical base member 11 made of an electrically conductive material such as aluminum, and a recording surface portion 12 which is made of an insulating material and covering the surface of the base member 11. The surface of the base member 11 is mirror-finished. The recording surface portion 12 is formed of alumite, a hard alumite or a porous hard aluminum oxide with a surface treatment for impregnation with tetrafluoro resin. The thickness of the recording surface portion generally ranges between 2 and 100 μm.

A surface treatment technique known as "tafuram treatment" (Mitsubishi Metal Corp). The base member 11 is electrically grounded.

As shown in FIG. 2, the electrostatic recording head 2 has a recording electrode 15 composed of an insulating substrate 13 made of a ceramics material or an epoxy resin and a multiplicity of linear electrodes 14 arranged on the surface of the insulating substrate 13, a permanent magnet 16 secured to the insulating substrate 13 of the recording electrode 15, and a magnetic member 18 secured to the surface of the electrode 15 opposite to the permanent magnet 16 through the intermediary of an insulating layer 17. The permanent magnet 16 may be a usual rare earth magnet having Br of 8.0 to 9.0 Kg and Hc of 7.8 to 9.0 kOe which magnet is spaced apart by a distance of 2 to 10 mm from the terminal end of the electrode 15 or to use a usual ferritic magnet having Br of 3.7 to 4.0 kG and Hc of not less than 3.1 which ferritic magnet is spaced apart by 2 to 20 mm from the terminal end of the electrode 15. The insulating layer 17 may be a insulating tape of polyvinyl chloride having a thickness of several hundred micrometers. The magnetic member 18 may be a Fe layer having a thickness of several tens of micrometers to 5 mm and a width of 1 to 20 mm, the end of which layer is spaced apart by several hundred micrometers to 10 mm from the terminal end of the electrode 15.

The linear electrodes 14 are sized such as to correspond to the size of the pixel and are arrayed over a predetermined recording width, e.g., width of an A-4 or B-4 size paper, at a predetermined interval. The linear electrodes 14 are formed of a ferromagnetic material such as a permalloy or nickel so that an image of a high quality can be obtained by an effect which will be described later. The permanent magnet 16 and the magnetic member 18 having a ferromagnetic characteristic are arranged over the entire width of the recording electrode 15 or a region greater than the width of the recording electrode 15. The ends of the permanent magnet 16 and the magnetic member 18 adjacent to the end of the electrode are retracted from this end of the electrode by a predetermined distance. The permanent magnet 16 is covered by a magnet cover 19 which extends to the end of the electrode. Similarly, the magnetic member 18 is covered by an electrode cover 20. The end of the electrode 15, however, is exposed in a degree of several millimeters. The magnet cover 19 may be an aluminum layer having a thickness of 2 to 10 mm, while the electrode cover 19 may be a layer of polyproylene or acrylic resin having a thickness of 2 to 10 mm.

The electrostatic recording head thus constructed is disposed to oppose the recording member 1 such that the end of the electrode 15 extends along the generating line of the cylindrical surface of the recording member 1 with a clearance of 30 to 500 μm. The electrostatic recording head 2 is mounted such that it is inclined at a predetermined angle in a range of 10~60 degrees in the downstream side as viewed in the direction of movement of the recording member 1 with respect to a line normal to the cylindrical surface of the recording head 1, so that a toner reservoir 21 is formed. The arrangement is such that the surface of the electrostatic recording head 2 carrying the magnetic member 18 faces the toner reservoir 21. A toner supplying device 3 is disposed above the toner reservoir 21.

The toner supplying device 3 includes a hopper 24 for storing a toner 22, and a toner supply rate control means provided on the lower end opener of the hopper 24 so as to extend over the entire recording width. The toner supply rate control means includes a cylindrical rotary member 26 disposed along the above-mentioned lower end opening of the hopper 24. The rotary member 26 is provided with a slit 25 which extends in the axial direction over the entire length thereof. The arrangement is such that the toner 22 is discharged from the hopper when the rotary member 26 is rotated to an angular position where the slit 27 is aligned with the angular position of the chute of the hopper 24. The hopper 24 is fed with the toner 22 by a screw feeder 28 which conveys the toner from the external side.

The toner collection device 4 includes a cylindrical magnet roller 30 which is arranged to oppose the recording surface of the recording member 1 downstream from the electrostatic recording head 2. The magnet roller 30 is magnetized such that N and S poles alternatingly appear in the circumferential direction thereof, and is adapted to be rotated in the direction of an arrow B. The magnet roller 30 is wholly enclosed by the hopper 31 except the portion opposing the recording member 1. One of the edges defining the opening of the hopper 31 is disposed in the close proximity of the recording surface of the recording member 1, while the other edge is arranged to contact with the peripheral surface of the magnet roller 30. The hopper 31 is provided with a screw feeder 32. The screw feeder 32 is connected to the aforementioned screw feeder 28 through another screw feeder which is not shown, so that collected toner is returned to the hopper 24 through these screw feeders.

The transfer roller 5 which is made of a conductive rubber is disposed on the downstream side of the toner collection device 4 as viewed in the direction of movement of the recording member 1, and is pressed onto the recording surface of the recording member 1. A transfer circuit 9, which serve to enable a toner image to be transferred from the recording member 1 to a recording paper 35, is electrically connected to the transfer roller 5. The recording paper 35 is inserted by a recording paper supply device (not shown) into the nip between the recording member 1 and the transfer roller 5 and is discharged from the nip a a result of rotation of the transfer roller 5 and the recording member 1. The recording paper 35 is then conveyed to a fixing device having the fixing roller 6 which applies heat or pressure to the toner on the recording paper thereby fixing the toner image on the recording paper 35.

A cleaner blade 38 is disposed in contact with the cylindrical surface of the recording member 1 at the downstream side of the transfer roller 5. The cleaner blade 38 scrapes off the toner particles remaining on the recording member 1 without being transferred. The scraped toner particles are collected in a hopper 39 disposed under the cleaner blade 38 by the force of gravity. A screw feeder 40 disposed in the hopper 39 is capable of discharging the collected toner particles to a toner waste box which is not shown.

The pulse driving circuit 8 is capable of applying recording voltage independently to the respective linear electrodes 14 in accordance with the pattern of the image to be recorded.

The operation of this embodiment is as follows.

Figure 3:
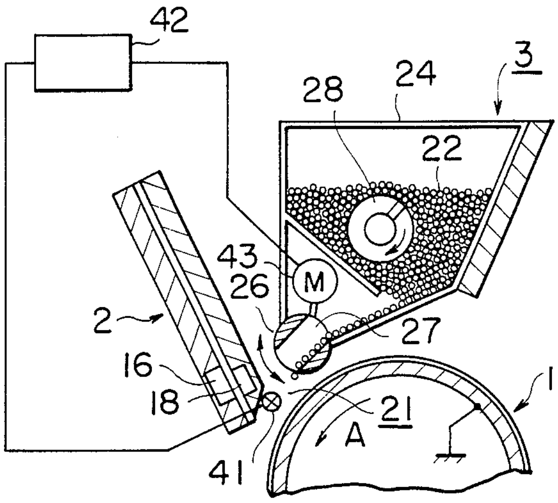
FIG. 3 is an illustration of an embodiment of a developing agent supplying device in accordance with the present invention.

The toner 22 used in this embodiment is a powdered or particulate material having both electrical conductivity and magnetic characteristic. The toner stored in the hopper 24 is moved downward by the force of gravity towards the bottom of the hopper 24 and is introduced to the rotary member 26 through the chute and is then supplied to the toner reservoir 21 through the slit 27. When the rate of supply of the toner is too large, the rotary member 26 is made to rotate to bring the slit 27 out of alignment with the toner outlet of the hopper, thus blocking the outlet. It is thus possible to control the rate of supply of the toner. This control can be conducted automatically by, for example, a system as shown in FIG. 3 which has a toner sensor 41 disposed in a suitable portion of the toner reservoir 21, and a developer level controller 42 which operates in accordance with the output from the toner sensor 41 such as to control a drive motor 43 for the rotary member 26 such that the level of the toner in the toner reservoir 21 detected by the toner sensor 41 is maintained at a predetermined standard level.

Figure 4A:
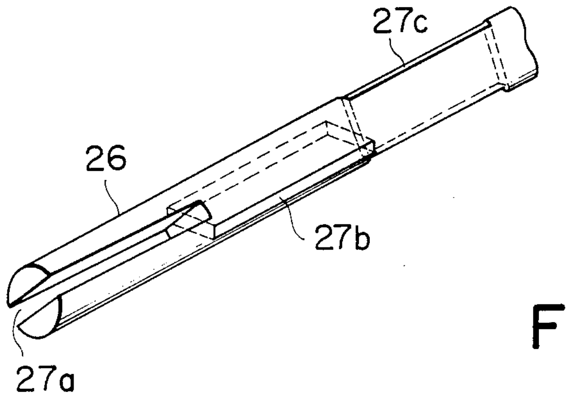
FIGS. 4(A) and 4(B) are a perspective view and a sectional view of a modification of a rotary member used in the embodiment shown in FIG. 3.
Figure 4B:
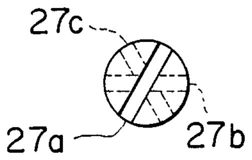

Preferably, the slit 27 in the rotary member 26 is divided into a plurality of sections in the axial direction of the rotary member 26 such that the sections 27*a*, 27*b* and 27*c* are arranged at different angles to the axis of the rotary member 26, as shown in FIGS. 4(A) and 4(B). According to this arrangement, it is possible to control the rates of supply of the toner in conformity with toner consumption even when the toner is consumed at different rates in different regions in the direction of width of the recording. The detection of the toner consumption distribution is conducted by, for example, counting the number of application of the recording voltage for each of the linear electrodes.

The toner thus supplied through the slit 27 is allowed to fall onto the toner reservoir 21 and is supplied to the recording region on the end of the recording electrode 15 by the effect of the force of gravity and the rotation of the recording member 1 taking place in the direction of an arrow A.

Figure 5:
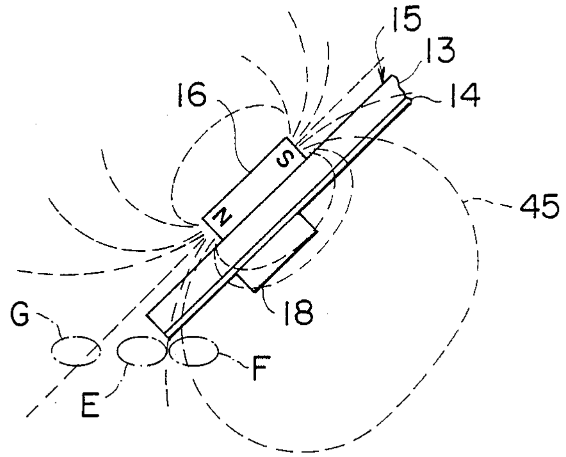
FIG. 5 is an illustration of the state of the magnetic lines of force around the electrostatic head.

The recording region on the end of the electrode is under the influence of a static magnetic field formed by the permanent magnet 16 as shown in FIG. 5. FIG. 5 schematically shows the state of the magnetic field formed around the recording electrode 15. Magnetic lines of force are shown by broken lines 45. In the illustrated embodiment, the permanent magnet 16 is disposed such that the magnetic axis thereof extends in the direction of longitudinal axes of the linear electrodes 14. The magnetic lines of force from the recording electrode 15 are allowed to expand in the free space at the side of the recording electrode 15 adjacent to the permanent magnet 16. On the other hand, the magnetic lines of force on the same side as the magnetic member 18 are influenced by the levels of the magnetic permeability of the magnetic member 18 and the recording electrode 15. Namely, the magnetic lines of force in the vicinity of the magnetic member 18 are seemingly absorbed by the magnetic member 18 do that the magnetic field is weakened in the region including the toner reservoir 21. In consequence, a region F of a high magnetic flux density and a region E of a low magnetic flux density are formed around the end of the recording electrode 15. Factors such as the sizes, shapes, positions and strengths of the permanent magnet 16 and the magnetic member 18 are determined such that the region F of high magnetic flux density is formed on the end of the recording electrode 15. For example, in a first case where there is used a permanent magnet having Br of 8.0 to 9.0 kG and Hc of 7.8 to 9.0 koe and having dimensions of 1 mm in thickness and 4 mm in length so as to provide the magnet 16, the magnet 16 is placed so that the end of the magnet is retracted by 4.5 mm from the terminal end of the electrode, and the magnetic member 18 having dimensions of 2 mm in thickness and 2 mm in length is placed so that the end of the magnetic member is retracted by 5.5 mm from the terminal end of the electrode. In a second case where there is used another permanent magnet having the same magnetic characteristics as in the first case and having dimensions of 2 mm thickness and 2 mm in length to provide the magnet 16, the magnet 16 is placed so that the end of the magnet 16 is retracted by 4.5 mm from the terminal end of the electrode, and the magnetic member 18 having dimensions of 2 mm in thickness and 2 mm in length is placed so that the end of the magnetic member is retracted by 3 mm from the terminal end of the electrode. In a third case where there is used still another permanent magnet having the same magnetic characteristics as in the first case and having dimensions of 1 mm thickness and 2 mm in length to provide the magnet 16, the magnet 16 is placed so that the end of the magnet 16 is retracted by 5 mm from the terminal end of the elctrode, and the magnetic member 18 having dimensions of 1 mm in width thickness and 4 mm in length is placed so that the end of the magnetic member is retracted by 6 mm from the terminal end of the electrode.

Figure 6:
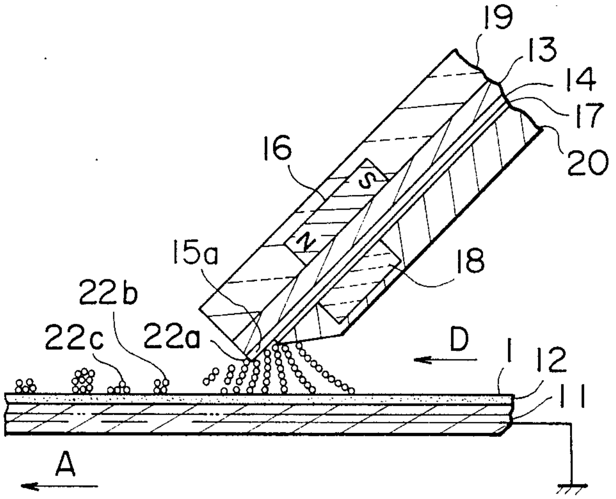
FIG. 6 is an illustration of operation of an electrostatic recording head.

The magnetic toner 22 is supplied to the region on the end of the electrode in the direction of an arrow D. The toner, under the influence of the magnetic field of the pattern described above, is arrayed along the magnetic lines of force so as to form a toner chain as shown in FIG. 6. The toner chain forms a bundle of assemblies 22*a* of a density and size which correspond to the density of the magnetic lines of force, i.e., the magnetic field intensity, shown in FIG. 5.

The pulse driving circuit 8 applies recording voltages on the order of several tens of volts to the independent linear electrodes 14 in accordance with image signals, so that positive charges are injected to the assemblies 22a contacting the linear electrodes 14 to which recording voltages are applied. The positive charges thus injected are distributed mainly in a region adjacent to the recording member 1. At the same time, negative charges are introduced into the boundary between the base member 11 and the recording surface portion 12 of the recording member 1. Therefore, the toner particles in the assemblies 22a with injected positive charges are strongly and electrostatically attracted by the recording member 1 and are allowed to easily leave the assemblies 22a from the downstream ends of these assemblies, so as to move accompanying the movement of the surface of the recording member 1. Meanwhile, particles of the toner supplied from the upstream side as viewed in the direction of movement of the surface of the recording member 1 are added to the assemblies 22a without delay so that the shapes of the assemblies 22a are maintained substantially constant so as to enable an image to be recorded stably, quickly and with a high degree of resolution with low recording voltages.

The toner particles with positive charges injected thereto move together with the recording member 1 so as to form groups 22b of toner particles which form an image to be recorded. It is often experienced that toner particles are freed from assemblies 22a even when no positive charges are injected to these assemblies. Such toner particles are adhered to the surface of the recording member 1 by physical forces such as van der Waals adsorption or electrostatic force generated as a result of friction charging, so as to form a group 22c of toner particles. Such a group 22c of toner particles undesirably causes fogging in the recorded image. The above-mentioned physical and electrostatic forces with which the toner particles of the group 22c adhere to the recording member 1 are rather weak, so that these toner particles can easily be separated from the recording member 1 by the actions of centrifugal force generated as a result of rotation of the recording member 1, force of gravity and magnetic attracting force produced by the magnet roller 30. The toner particles thus freed from the recording member 1 are conveyed in the direction of an arrow B as a result of rotation of the magnet roller 30 and are collected in a hopper 31. The toner particles collected in the hopper 31 are returned to the toner supplying device 3 through the screw feeder 32 so as to be used repeatedly.

Thus, the magnetic toner particles of the group 22c adhering with small adhesion force are removed from the surface of the recording member 1 and only the toner particles of the groups 22b corresponding to the recording voltages, sticking to the recording member with high levels of adhesion force, are allowed to remain on the surface of the recording member 22b, whereby a clean image without any fog can be obtained.

As the recording member 1 rotates, the toner image formed on the surface of the recording member 1 is transferred to the recording paper 35 which is pressed onto the recording member 1 by means of the transfer roller 5. More specifically, a voltage of a polarity opposite to the polarity of the toner particles of the groups 22b is applied to the transfer roller 5 through the transfer circuit 9 mentioned before so that an electrostatic attracting force is generated. Thus, the transfer of the toner image is effected by this electrostatic attracting force and also by the mechanical contract between the recording paper 35 and the toner image. The recording paper 35 is then conveyed to the fixing station where the transferred toner image is fixed by the fixing roller 6, whereby the toner particles forming the image are fixed to produce a permanent record of image.

Toner particles still remaining on the recording member 1 without being transferred to the recording paper 35 are scraped by the cleaner blade 38 off the recording member 1 so as to be collected in the hopper 39.

The electrostatic recording head 2 will be explained in more detail.

As stated before, the toner particles are magnetic so that they are arrayed along the magnetic lines of force so as to form a bundle of assemblies 22a as shown in FIG. 6 when supplied to the region on the end of the electrode. These assemblies 22a of the toner particles are selectively charged by charge injection from the corresponding recording electrodes 14 so that the toner particles are attracted by the recording member 1 so as to form groups 22b of toner particles corresponding to the respective pixels.

In order to obtain high levels of density, clearness and resolution of the recorded image, it is required that the size of each group 22b of toner particles equals the size of the pixel and that each group is composed of a sufficiently large amount of toner particles.

These requirements are met when the following conditions are satisfied.

The first requisite is that a toner chain is formed by close contact of toner particles supplied to the region on the end of the electrode.

This is because lack of such a toner chain impedes the injection of charges into the toner particles effected by the recording voltages, making it impossible to record the image with high density.

To satisfy this condition, it is necessary that a strong magnetic field in a degree of 200 to 600 gauss is formed in the region (see F in FIG. 5) where the linear electrode 14 opposes the recording member 1.

The second requisite is that the assembly 22a of the toner chain formed on the end of the electrode has a size, i.e., thickness as observed in the direction of movement of the surface of the recording member 1, optimized in relation to the size of the pixel.

A too large size of the assembly 22a, which is caused by a magnetic field of a too high intensity, impairs the fluidity of the toner on the end of the electrode, with the results that the density of the recording image is lowered and the recording speed is limited. In addition, high levels of recording voltage are required to inject charges overcoming such a too high magnetic field intensity.

To satisfy this demand, it is necessary that a strong magnetic field of 200 to 600 gauss is formed only in the region (see F in FIG. 5) corresponding to the size of the pixel, while weakening the magnetic field in other regions to a degree of several tens to 200 gauss.

The third requisite is that the position of the leading end of the toner assembly 22a is maintained constant.

If this condition is not met, cleanness and resolution of the recorded image are impaired due to offset of the image.

To sum up, it is necessary that a strong magnetic field is formed only in the region (see F in FIG. 5) on the end of the electrode, that the fluidity of the toner is improved and that the assemblies 22a of the toner particles are formed always at constant positions.

In the described embodiment, the electrostatic recording head 2 has the magnet 16 and the magnetic member 18 both of which are provided on one and the other surfaces of the plane electrode 14, respectively, and the thus constructed electrostatic recording head 2 is disposed to oppose the recording member such that the toner reservoir is formed on the same side as the magnetic member 18. The magnetic lines of force adjacent to the toner reservoir are absorbed by the magnetic member 18 so that the magnetic field intensity is reduced in the region including the toner reservoir, while a strong magnetic field is formed in the region on the end of the electrode. Thus, the described embodiment satisfy all the first to third requisites mentioned above, thus making it possible to perform a high-speed recording with increased levels of density, clearness and resolution.

It is assumed here that the recording is conducted at a density of 8 lines/mm. In such a case, the pixel size is about 100 μm. It is also assumed that the pitch of the linear electrodes 14 is 125 μm and that the width of each linear electrode 14 is half that of the pitch. In this case, the width of the electrode 14 is calculated to be 62 μm. Such arrangement of the linear electrodes 14 can be obtained by, for example, etching with a thickness of the electrodes 14 on the order of several tens of μm at the greatest. Toners used as developers usually have particle sizes of 5 μm to several tens of μm. When such an ordinary toner is used, it is necessary to expose the end 15*a* of the recording electrode 15 over a predetermined length as shown in FIG. 6 in order to obtain the thickness of the assembly 22*a* corresponding to the size of the pixel and in order to ensure close contact between the recording electrode 15 and the toner particles.

A supplementary description will be given of the behavior of the toner particles around the end of the electrode. The toner particles in the toner reservoir 21 are conveyed in the direction of the arrow D towards the region on the end of the electrode in accordance with the movement of the surface of the recording member 1. The toner particles, upon reaching the region F where the density of the magnetic lines of force is high, form an assembly 22*a* of toner chain in which the toner particles strongly and closely contact one another. This assembly 22*a* tends to be moved towards the region where the density of the magnetic lines of force is low, as a result of movement of the surface of the recording member 1. In the region E, however, the toner particles cannot form the assembly 22*a* stably and are dissociated and freed so as to form a group 22*c* of toner particles which adhere to the recording member 1 with small adhesion force or to be brought back to the region F by the influence of the strong magnetic field in the region F, whereby the shape and position of the assembly 22*a* are maintained stably.

Thus, the size and the position of the assembly 22*a* formed on the end of the electrode are maintained substantially constant by the influence of the magnetic field in the region F where the density of the magnetic lines of force is high, while the toner particles as the constituent elements of the assembly 22*a* are continuously replaced. It is therefore possible to inject the positive charges overcoming the magnetic force so as to ensure high clearness and resolution of the recorded image without any distortion, even with reduced levels of recording voltage.

As explained before, the strong magnetic field is formed only in the region F by virtue of action of the magnetic member 18, so that a toner chain of a length corresponding to several tens of pieces of toner particles can be maintained stably. This in turn enables the gap between the recording electrode 15 and the recording member 1 to have a large size, eliminating troubles such as clogging of the gap by dust or fused and solidified toner so as to avoid degradation of the image attributable to clogging, while facilitating the assembly of the electrostatic recording head and apparatus.

In explaining more specifically, by providing the intensive magnetic field in the specific narrow area (Fγ, stable toner chains each having a length of 1 to 2 times the pitch of the linear electrodes 14 can be provided between each of the linear electrodes and the recording member 1. For example, in a case of the linear electrodes arranged with a rate of 8 lines/mm with a pitch of 125 μm, there are obtained toner chains each having a length of 125 to 250 μm in each of which toner chains the toner particles are connected firmly, with the result that it is possible to provide a large clearance in the order of about 200 μm between the recording electrodes and the recording member without degrading both the resolution of images and the density thereof, which clearance corresponds to the length of toner particles of 20 or more pieces connected in a chain shape. Further, when effecting the recording with a resolution of 8 lines/mm, it is preferred to restrict within a range of not more than 60 μm (a half of the pitch of 8 lines/mm, i.e, a length of several pieces of toner particles) a variation in the position of the toner particles adhered onto the recording member 1. In the invention, it is possible to restrict this variation within a range corrsponding to the length of several pieces of tone particles with respect to the position of the toner chain in contact with the recording member which toner chain has a length of 20 pieces of toner particles.

As described before, the magnetic member 18 and the toner reservoir 21 are disposed on the same side of the recording electrode so that the magnetic field in the region including the toner reservoir 21 is significantly weakened. Therefore, the toner particles can move with high degree of fluidity at the trailing side of the end of the electrode as viewed in the direction of supply because they are not substantially influenced by the magnetic field. It is therefore possible to stably supply the toner in accordance with the toner consumption from the region on the end of the electrode, thus attaining high levels of clearness and density of the recorded image.

The electrode cover 20 covering the magnetic member 18 facilitates the movement of the toner particles towards the region on the end of the electrode where the magnetic field is strong. This eliminates any tendency for the toner supply to become unstable due to attaching of the toner particles to the magnetic member.

The electrode cover 20 is preferably grounded. The grounded electrode cover 20 produces an effect to remove friction electrostatic charge from the toner 22 so as to reduce the tendency for the free toner particles to attach to the recording member 1 caused by friction electrostatic charge, thereby preventing fogging which may be caused by attaching of such free charges.

The electrode cover 20 may be made of polypropylene or acrylic resin or may be made of a non-magnetic substance such as aluminum etc., which cover has a thickness of about 5 mm.

It is also preferred that the electrostatic recording head 2 is disposed on the same side as the magnetic member 18 at an inclination by a predetermined angle, e.g., 30 to 60° , in a manner shown in FIG. 6. This arrangement is effective in reducing the magnetic field intensity in the regions E and G shown in FIG. 5, so as to reduce the magnetic force acting on the groups 22 band 22*c* of the toner particles attracted by and attaching to the recording member 1. This prevents disturbance of the recorded image by the magnet 16. At the same time, the attraction of the toner particles of the group 22*c* adhering with small adhesion force towards the magnet 16 can be reduced. Toner particles separated from the recording member 1 due to, for example, centrifugal force may fly towards the magnet 16. Such toner particles, however, cannot reach the region where a strong magnetic field is formed by the magnet 16, because the magnet 16 is covered by a non-magnetic magnet cover 19. The freed toner particles, therefore, fall onto the recording member 1 and are removed by the magnet roller 30 of the toner collection device 4, so that these freed particles do not impair the quality of the recorded image.

Different embodiments of the electrostatic recording head of the present invention will be described with reference to FIGS. 7 to 10. In these Figures, the same reference numerals are used to denote members or parts having the same construction or function as those of the first embodiment explained in connection with FIG. 6.

Figure 7:
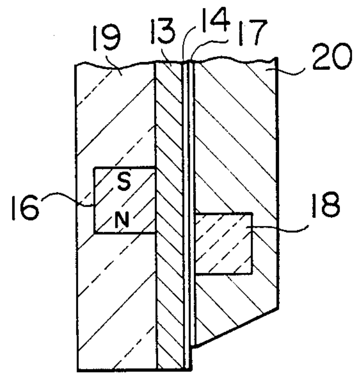
FIGS. 7 to 10 are sectional views of critical portions of different embodiments of the electrostatic recording head in accordance with the present invention.

The embodiment shown in FIG. 7 is discriminated from that of FIG. 6 in the shapes of the magnet 16 and the magnetic member 18. Namely, the magnet 16 and the magnetic member 18 of the embodiment shown in FIG. 7 have lengths of 2 to 3 mm and thicknesses of 2 to 3 mm which are smaller and greater, respectively, than those in the embodiment shown in FIG. 6.

Figure 8:
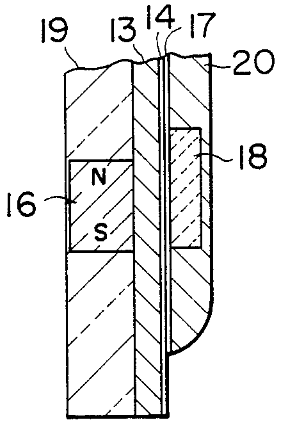

In the embodiment shown in FIG. 8, the polarity of the magnet 16 is reversed and the length and thickness of the same are reduced and increased, respectively.

It will be understood that the embodiments shown in FIGS. 7 and 8 produce the same effects as those produced by the electrostatic recording head of the embodiment shown in FIG. 6. Thus, what are required are to determine the sizes and shapes of the magnetic member 18 and the magnet 16 such that the spreading of the magnetic lines of force is suppressed to develop a high magnetic field intensity only in the region F shown in FIG. 5, while weakening the magnetic field in the region which includes the toner reservoir 21.

In the embodiments shown in FIGS. 7 and 8, the radius of curvature of the magnetic lines of force is large in the region F due to the fact that the magnet 16 has a large thickness. (The radius of curvature is a relatively large value of about 5.5 mm while the radius of curvature in the case of FIG. 6 is about 4 mm.) In consequence, the spreading of the magnetic lines of force is reduced in the region F, making it possible to increase the size of the gap between the recording electrode 15 and the recording member 1. In the embodiment shown in FIG. 8, the radius of curvature of the magnetic lines of force and, hence, the size of the above-mentioned gap can be further increased by virtue of the fact that the magnetic member 28 has reduced width and increased length.

Figure 9:
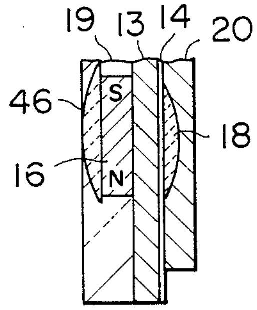

The embodiment shown in FIG. 9 has the magnetic member 18 which is configured to follow the streams of the magnetic lines of force, so as to eliminate any wasteful portion of the magnetic member. In addition, a second magnetic member 46 is disposed on the rear side of the magnet 16. This second magnetic member 46 is made of Fe and has a length of 4.5 mm and a thickness of 0.8 mm regarding the thickest part in the convex portion thereof.

The second magnetic member absorbs magnetic lines of force which exist on the side of the electrostatic recording head 2 opposite to the toner reservoir, so as to reduce the influence of the magnetic field on the toner particles of the groups 22*b* which participate in the image recording, thereby to suppress distortion of image which may otherwise be caused by the influence of the magnetic field.

Figure 10:
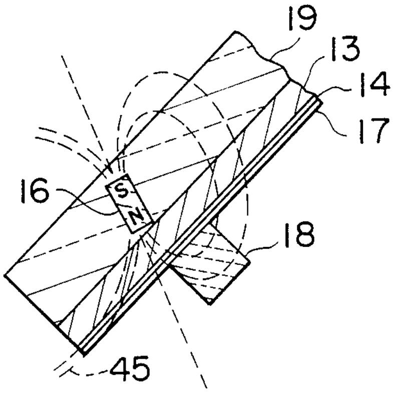

The magnet 16 may be disposed such that the magnetic axis thereof is inclined in a range of 0 ° to 45° , preferably 35° , with respect to the surface of the recording electrode 15, as shown in FIG. 10. This makes it possible to form a strong magnetic field only in the region F and to stably form a bundle of assemblies 22*a* having optimum size and thickness.

The electrostatic recording head 2 may be assembled by attaching a magnetized magnet 16 to the insulating substrate 13 of the recording electrode 15. In some cases, however, the assembly is impeded due to the magnetic force produced by the magnet 16. It is therefore preferred that a permanent magnet member, which has not been magnetized yet, is attached to the insulating substrate 13 and then suitably magnetized, so that the assembly can be conducted more easily without being hampered by the magnetic force of the magnet.

The first embodiment of the image recording apparatus is constructed such that the image formed on the recording member 1 is transferred to a recording paper 35 and then fixed to form a permanent record on the recording paper. This, however, is only illustrative and the image formed on the recording member 1 may directly be displayed, partly because the surface of the recording member 1 has been mirror-finished and partly because the image recorded on the recording member 1 has high levels of density, clearness and resolution.

Figure 11:
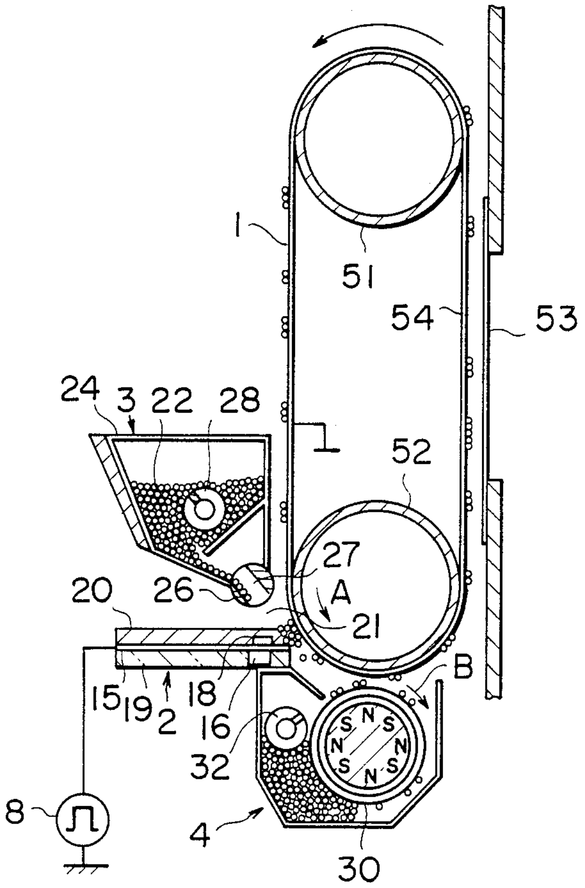
FIG. 11 is a sectional view of a display device embodying the invention.

More specifically, the components of the transfer device such as the transfer roller 5 are removed in the embodiment of FIG. 1 so that a portion of the surface of the recording member 1 is directly used as a display region 54, whereby a display device shown in FIG. 11 is obtained. Since the image recorded on the recording member 1 is a mirror image, it is necessary that the image is inverted when the apparatus is used for the purpose of display. It is also preferred that the recording member 1 is formed as an endless belt so that a flat run 54 of the belt is presented for use as a display screen. The reference numeral 53 is a display window.

As has been described, the present invention offers various advantages.

In the electrostatic recording head of the present invention, the magnetic lines of force are absorbed by the magnetic member which is disposed on the opposite side of the recording electrode to the magnet, so that the magnetic field is weakened in the space where the toner reservoir is formed. On the other hand, magnetic lines of force which run from the end of the recording electrode towards the portion of the recording member opposing to the end of the electrode are not weakened because they are not substantially influenced by the magnetic member.

Therefore, in the image recording apparatus incorporating this electrostatic head, a magnetic field intensity distribution is formed such that the magnetic field intensity is highest in the region on the end of the electrode and then drastically decreases towards the region including the toner reservoir in the direction of movement of the recording member, whereby a stable toner chain can be formed only in the restricted region on the end of the electrode.

This in turn makes it possible to break the toner chain to free toner particles for the purpose of recording, with a reduced amount of charges injected to the toner chain, thus making it possible to operate the recording apparatus with reduced levels of recording voltage.

In addition, the fluidity of the toner in the toner reservoir is increased so as to smooth and stabilize the supply of the toner to the recording region, thus making it possible to increase the recording speed.

The optimized magnetic field distribution and the increased fluidity of the toner in combination offer an advantage that the toner chain can be formed and maintained at constant position on the recording region, so that the clearness and density of the recorded image are improved.

The toner supplying device of the invention provides a uniform distribution of the toner supply rate in the widthwise direction of the recording, thus contributing to improvement in the quality of the recorded image.

The display device of the present invention makes it possible to use a portion of the recording member directly as a display screen so that the clear image formed on the recording member can directly viewed by the user.

Finally, in the method of the present invention for producing an electrostatic recording head, the magnet is attached to the recording electrode before it is magnetized and is then magnetized after the assembly. In consequence, the assembly is facilitated as compared with the case where a magnetized permanent magnet is used, because the assembly can be conducted without being influenced by the magnetic force produced by such a permanent magnet.

What is claimed is:

1. An electrostatic recording head comprising:

a recording electrode having a plurality of linear electrodes arranged in a common plane at predetermined intervals;

a magnet disposed at one side of said recording electrode; and a magnetic member disposed at a side of said recording electrode opposite to said magnet;

said magnet being disposed so that magnetic lines of force pass through an end of said recording electrode towards a portion of a recording member opposed by said end of said recording electrode.

2. An electrostatic recording head according to claim 1, wherein said plurality of linear electrodes are arrayed on an insulating substrate, and wherein said magnet is disposed at the same side of said recording electrode as said insulating substrate while said magnetic member is disposed at the same side of said recording electrode as said linear electrodes.

3. An electrostatic recording head according to claim 2, wherein ends of said magnet and said magnetic member adjacent to said end of said recording electrode are retracted from said end of said recording electrode by respective predetermined distances.

4. An electrostatic recording head according to claim 3, wherein said magnet is a permanent magnet, and wherein a region between said magnet and said end of said recording electrode is covered by one of a non-magnetic cover and a magnetic cover.

5. An electrostatic recording head according to claim 4, wherein a region between said magnetic member and said end of said recording electrode is covered by one of a non-magnetic cover and a magnetic cover.

6. An electrostatic recording head according to any one of claims 3, 4 and 5, wherein a second magnetic member is disposed at a side of said magnet opposite to said recording electrode.

7. An image recording apparatus comprising:

an electrostatic recording head according to claim 6; and a recording member movable at a predetermined speed;

wherein said electrostatic recording head is disposed so that said end of said recording electrode opposes a surface of said recording member and so that said side of said recording electrode at which said magnetic member is disposed, is disposed at a railing side of said electrostatic recording head as viewed in a direction of movement of said recording member, so that a developing agent reservoir is formed by said electrostatic recording head and said recording member at said trailing side of said electrostatic recording head, said apparatus further comprising:

developing agent supplying means for continuously supplying a magnetic developing agent into said developing agent reservoir; and means for supplying recording voltages of levels corresponding to an image to be recorded to said linear electrodes of said recording electrode so as to cause said developing agent to be electrostatically deposited on said surface of said recording member.

8. An image recording apparatus according to claim 7, wherein said surface of said recording member is a cylindrical surface, and wherein said electrostatic recording head is disposed such that said end of said recording electrode extends along a generatrix of said cylindrical surface of said recording member, said electrostatic recording head being inclined at a predetermined angle towards said developing agent reservoir with respect to a line normal to said cylindrical surface.

9. An image recording apparatus according to claim 8, wherein said developing agent supplying means is disposed so that a longitudinal direction of said developing agent supplying means conforms with a longitudinal direction of said electrostatic recording head.

10. An image recording apparatus according to claim 9, further comprising a developing agent collecting device including a magnet which is disposed to oppose said surface of said recording member at a downstream side of said electrostatic recording head.

11. An image recording apparatus according to claim 9, wherein said developing agent supplying means comprises:

a hopper for storing a developing agent; and a developing agent supply rate control means provided in a bottom opening of said hopper, said bottom opening of said hopper having an elongated form and having a length substantially corresponding to a recording width, said developing agent supply rate control means including a cylindrical rotary member disposed to close said bottom opening of said hopper and having a slit extending in an axial direction of said rotary member.

12. An image recording apparatus according to claim 11, wherein said slit is divided into a plurality of sections in said axial direction of said rotary member, said sections being inclined at different angles relative to each other about an axis of said rotary member.

13. An image recording apparatus according to claim 12, further comprising control means for controlling a rotational position of said rotary member in accordance with a number of applications of said recording voltages to said linear electrodes.

14. An image recording apparatus according to claim 11, further comprising control means for controlling a rotational position of said rotary member in accordance with a number of applications of said recording voltages to said linear electrodes.

15. An image recording apparatus comprising:

an electrostatic recording head according to any one of claims 1, 2, 3, 4 and 5; and a recording member movable at a predetermined speed;

wherein said electrostatic recording head is disposed so that said end of said recording electrode opposes a surface of said recording member and so that said side of said recording electrode at which said magnetic member is disposed, is disposed at a trailing side of said electrostatic recording head as viewed in a direction of movement of said recording member, so that a developing agent reservoir is formed by said electrostatic recording head and said recording member at said trailing side of said electrostatic recording head, said apparatus further comprising:

developing agent supplying means for continuously supplying a magnetic developing agent into said developing agent reservoir; and means for supplying recording voltages of levels corresponding to an image to be recorded to said linear electrodes of said recording electrode so as to cause said developing agent to be electrostatically deposited on said surface of said recording member.

16. An image recording apparatus according to claim 15, wherein said surface of said recording member is a cylindrical surface and wherein said electrostatic recording head is disposed such that said end of said recording electrode extends along a generatrix of said cylindrical surface of said recording member, said electrostatic recording head being inclined at a predetermined angle towards said developing agent reservoir with respect to a line normal to said cylindrical surface.

17. An image recording apparatus according to claim 16 wherein said developing agent supplying means is disposed so that a longitudinal direction of said developing agent supplying means conforms with a longitudinal direction of said electrostatic recording head.

18. An image recording apparatus according to claim 17, further comprising a developing agent collecting device, including a magnet, which is disposed to oppose said surface of said recording member at a downstream side of said electrostatic recording head.

19. An image recording apparatus according to claim 17, wherein said developing agent supplying means comprises:

a hopper for storing a developing agent; and a developing agent supply rate control means provided in a bottom opening of said hopper, said bottom opening of said hopper having an elongated form and having a length substantially corresponding to a recording width, said developing agent supply rate control means including a cylindrical rotary member disposed to close said bottom opening of said hopper and having a slit extending in an axial direction of said rotary member.

20. An image recording apparatus according to claim 19, wherein said slit is divided into a plurality of sections in said axial direction of said rotary member, said sections being inclined at different angles relative to each other about an axis of said rotary member.

21. An image recording apparatus according to claim 20, further comprising control means for controlling a rotational position of said rotary member in accordance with a number of applications of said recording voltages to said linear electrodes.

22. An image recording apparatus according to claim 19, further comprising control means for controlling a rotational position of said rotary member in accordance with a number of applications of said recording voltages to said linear electrodes.

23. A display device comprising:

an electrostatic recording head according to any one of claims 1, 2, 3, 4 and 5; and a recording member movable at a predetermined speed;

wherein said electrostatic recording head is disposed such that said end of said recording electrode opposes a surface of said recording member and such that said side of said recording electrode at which said magnetic member is disposed, is disposed at a trailing side of said electrostatic recording head as viewed in a direction of movement of said recording member, so that a developing agent reservoir is formed by said electrostatic recording head and said recording member at said trailing side of said electrostatic recording head, said display device further comprising:

developing agent supplying means for continuously supplying a magnetic developing agent into said developing agent reservoir;

means for supplying recording voltages of levels corresponding to an image to be recorded to said linear electrodes of said recording electrode so as to cause said developing agent to be electrostatically deposited on said surface of said recording member; and a magnet disposed to oppose a portion of said recording member at a downstream side of said electrostatic recording head so as to collect any surplus developing agent from said recording member;

wherein a portion of said recording member downstream from said magnet is used as a display screen.

24. A developing agent supplying device comprising:

a hopper for storing a developing agent; and a developing agent supply rate control means provided in a bottom opening of said hopper, said bottom opening of said hopper having an elongated form and having a length substantially corresponding to a recording width, said developing agent supply rate control means including a cylindrical rotary member disposed to close said bottom opening of said hopper and having a slit extending in an axial direction of said rotary member.

25. A developing agent supplying device according to claim 24, wherein said slit is divided into a plurality of sections in said axial direction of said rotary member, said sections being inclined at different angles relative to each other about an axis of said rotary member.

26. A developing agent supplying device according to either one of claims 24 and 25, further comprising control means for controlling a rotational position of said rotary member in accordance with a number of applications of a recording voltage to a recording electrode.

27. An image recording apparatus comprising:

a cylindrical recording member rotatable at a predetermined speed;

an electrostatic recording head opposing said recording member along a generatrix of a cylindrical surface of said recording member;

a developing agent supplying device disposed above a developing agent reservoir which is defined by said electrostatic recording head and said recording member at a trailing side of said electrostatic recording head as viewed in a direction of rotation of said recording member;

a developing agent collecting device including a magnet which is disposed to oppose said surface of said recording member at a downstream side of said electrostatic recording head;

a transfer device including a transfer roller which is pressed to said surface of said recording member at a leading side of said developing agent collecting device as viewed in said direction of rotation of said recording member;

a recording paper supplying device for supplying a sheet of recording paper into a nip between said transfer roller and said recording member; and a fixing device for clamping said recording paper after it is discharged from said nip so as to fix developing agent transferred to said recording paper by said transfer device;

wherein said electrostatic recording head comprises:

a recording electrode having a plurality of linear electrodes arranged in a common plane at predetermined intervals;

a magnet disposed at one side of said recording electrode; and a magnetic member disposed at a side of said recording electrode opposite to said magnet;

said magnet being disposed such that magnetic lines of force pass through an end of said recording electrode towards a portion of said recording member opposed by said end of said recording electrode, said electrostatic recording head being arranged with said side at which said magnetic member is disposed being directed to said trailing side of said electrostatic recording head at an inclination of a predetermined angle towards said trailing side with respect to a line normal to said cylindrical surface of said recording member; and wherein said developing agent supplying device comprises:

a hopper for storing a developing agent; and a developing agent supply rate control means provided in a bottom opening of said hopper;

said bottom opening of said hopper having an elongated form and having a length substantially corresponding to a recording width, said developing agent supply rate control means including a cylindrical rotary member disposed to close said bottom opening of said hopper and having a slit extending in an axial direction of said rotary member.

28. A method of producing an electrostatic recording head comprising the steps of:

preparing a recording electrode having an insulating substrate and a plurality of linear electrodes arrayed on one side of said insulating substrate at predetermined intervals;

securing a non-magnetized permanent magnet member to the same side of said recording electrode as said insulating substrate; and magnetizing said permanent magnet member such that magnetic lines of force from said magnetized permanent magnet member run through an end of said recording electrode towards a portion of a recording member opposed by said end of said recording electrode.

29. A display device comprising:

an electrostatic recording head according to claim 6; and a recording member movable at a predetermined speed;

wherein said electrostatic recording head is disposed such that said end of said recording electrode opposes a surface of said recording member and such that said side of said recording electrode at which said magnetic member is disposed, is disposed at a trailing side of said electrostatic recording head as viewed in a direction of movement of said recording member, so that a developing agent reservoir is formed by said electrostatic recording head and said recording member at said trailing side of said electrostatic recording head, said display device further comprising:

developing agent supplying means for continuously supplying a magnetic developing agent into said developing agent reservoir;

means for supplying recording voltages of levels corresponding to an image to be recorded to said linear electrodes of said recording electrode so as to cause said developing agent to be electrostatically deposited on said surface of said recording member; and a magnet disposed to oppose a portion of said recording member at a downstream side of said electrostatic recording head so as to collect any surplus developing agent from said recording member;

wherein a portion of said recording member downstream from said magnet is used as a display screen.--

* * * * *